(12) United States Patent
Ahmed et al.

(10) Patent No.: US 7,910,645 B2
(45) Date of Patent: Mar. 22, 2011

(54) BREATHABLE BIODEGRADABLE HOT MELT COMPOSITION

(75) Inventors: Sharf U. Ahmed, Woodbury, MN (US); Andualem W. Emiru, Woodbury, MN (US)

(73) Assignee: H.B. Fuller Company, St. Paul, MN (US)

( * ) Notice: Subject to any disclaimer, the term of this patent is extended or adjusted under 35 U.S.C. 154(b) by 1350 days.

(21) Appl. No.: 10/211,162

(22) Filed: Aug. 1, 2002

(65) Prior Publication Data

US 2003/0100645 A1 May 29, 2003

Related U.S. Application Data

(60) Provisional application No. 60/309,318, filed on Aug. 1, 2001.

(51) Int. Cl.
*C08K 5/00* (2006.01)
(52) U.S. Cl. .................................................. 524/292
(58) Field of Classification Search .................. 524/292
See application file for complete search history.

(56) References Cited

U.S. PATENT DOCUMENTS

| | | | |
|---|---|---|---|
| 4,758,239 A | 7/1988 | Yeo et al. | 604/366 |
| 4,828,556 A | 5/1989 | Braun et al. | 604/365 |
| 4,842,666 A | 6/1989 | Werenicz | 156/161 |
| 4,863,778 A | 9/1989 | Metcalfe | 428/131 |
| 5,143,773 A | 9/1992 | Takuno | 428/137 |
| 5,143,961 A | 9/1992 | Scholl et al. | 524/317 |
| 5,164,258 A | 11/1992 | Shida et al. | 428/319 |
| 5,446,079 A * | 8/1995 | Buchanan et al. | 524/41 |
| 5,508,371 A | 4/1996 | Werenicz et al. | 528/76 |
| 5,532,053 A | 7/1996 | Mueller | 428/287 |
| 5,534,575 A | 7/1996 | Foster et al. | 524/270 |
| 5,589,249 A | 12/1996 | Bodford et al. | 428/200 |
| 5,625,029 A | 4/1997 | Hubbs et al. | 528/354 |
| 5,631,078 A | 5/1997 | Ellery et al. | 428/311.71 |
| 5,660,887 A | 8/1997 | Werenicz et al. | 427/385.5 |
| 5,663,286 A | 9/1997 | Ahmed et al. | 528/339 |
| 5,700,344 A | 12/1997 | Edgington et al. | 156/336 |
| 5,753,724 A | 5/1998 | Edgington et al. | 523/124 |
| 5,827,252 A | 10/1998 | Werenicz et al. | 604/367 |
| 5,851,661 A | 12/1998 | Werenicz et al. | 428/350 |
| 5,863,979 A | 1/1999 | Ahmed | 524/538 |
| 5,869,596 A * | 2/1999 | Ahmed et al. | 528/339 |
| 5,883,217 A | 3/1999 | Werenicz et al. | 528/59 |
| RE36,177 E | 4/1999 | Rouyer et al. | 53/428 |
| 5,998,505 A * | 12/1999 | Brink | 523/218 |
| 6,071,450 A | 6/2000 | Topolkaraev et al. | 264/173.12 |
| 6,087,550 A | 7/2000 | Anderson-Fischer et al. | 604/364 |
| 6,103,809 A | 8/2000 | Ahmed et al. | 524/489 |
| 6,114,024 A | 9/2000 | Forte | 428/315.9 |
| 6,117,438 A | 9/2000 | Topolkaraev et al. | 424/404 |
| 6,120,887 A | 9/2000 | Werenicz et al. | 428/219 |
| 6,184,261 B1 * | 2/2001 | Biby et al. | 521/84.1 |
| 6,239,192 B1 * | 5/2001 | Muller et al. | 523/124 |
| 6,432,547 B1 * | 8/2002 | Kroll et al. | 428/474.4 |
| 6,534,561 B1 * | 3/2003 | Corzani et al. | 523/111 |
| 6,703,115 B2 * | 3/2004 | Hale et al. | 428/212 |
| 2003/0113548 A1 * | 6/2003 | Corzani et al. | 428/423.1 |
| 2003/0121101 A1 * | 7/2003 | Corzani et al. | 5/487 |

FOREIGN PATENT DOCUMENTS

| | | |
|---|---|---|
| CA | 02312489 | 6/1999 |
| EP | 963 760 A1 | 12/1999 |
| EP | 963 837 A1 | 12/1999 |
| EP | 964 026 A1 | 12/1999 |
| JP | 7-257660 | 10/1995 |
| WO | WO92/09654 | 6/1992 |
| WO | WO98/04626 | 2/1998 |
| WO | WO 99/28048 | 6/1999 |
| WO | WO99/06505 | 12/1999 |
| WO | WO 01/41600 A2 | 6/2001 |

OTHER PUBLICATIONS

ASTM E96-95, "Standard Test Methods for Water Vapor Transmission of Materials," Mar. 6, 1995 (pp. 697-704).
Benzoflex 2088 benzoate plasticzer product literature, Velsicol Chemicals Corp. (3 pages).
Benzoplex 9-88 dipropylene glycol dibenzoate plasticzer product literature, Velsicol Chemicals Corp. (3 pages).

* cited by examiner

*Primary Examiner* — Nathan M Nutter

(57) ABSTRACT

A composition that includes a biodegradable aliphatic-aromatic polyester and plasticizer including polar groups and exhibits a moisture vapor transmission rate of at least 400 g/m²/day.

26 Claims, 1 Drawing Sheet

BREATHABLE BIODEGRADABLE HOT MELT COMPOSITION

REFERENCE TO RELATED APPLICATIONS

This application claims priority to U.S. Provisional Application Ser. No. 60/309,318, filed Aug. 1, 2001.

BACKGROUND OF THE INVENTION

The invention relates to increasing the breathability of a biodegradable polymer film.

It is desirable for films that are used in disposable applications including, e.g., personal hygiene, to be breathable and to exhibit good "hand," i.e., softness. Breathability refers to the ability of moisture or water vapor to diffuse through a medium, e.g., a film or garment. The moisture vapor transmission rate of a film is generally related to the breathability of the film.

Various biodegradable polymers have been developed in an effort to enhance the disposal of waste generated by personal hygiene articles and disposable diapers in particular. These biodegradable polymers degrade under compost conditions into organic components such as carbon dioxide and water.

Some of these biodegradable polymers have high viscosity. As a result, it is difficult to process these biodegradable polymers under standard hot melt conditions and to coat thin films using these biodegradable polymers.

SUMMARY

In one aspect, the invention features a composition that includes biodegradable aliphatic-aromatic copolyester (e.g., poly(tetramethylene adipate-co-terephthalate)) and plasticizer that includes polar groups, the composition exhibits a moisture vapor transmission rate of at least 400 $g/m^2/day$. In some embodiments, the composition is biodegradable. In other embodiments, the composition exhibits a moisture vapor transmission rate of at least 1000 $g/m^2/day$. In other embodiments, the composition exhibits a moisture vapor transmission rate of at least 2000 $g/m^2/day$.

In some embodiments, the plasticizer is selected from the group consisting of esters of citric acid, benzoic acid esters and combinations thereof. In other embodiments, the plasticizer is selected from the group consisting of sucrose benzoate, 1,4-cyclohexane dimethanol dibenzoate, dipropylene glycol dibenzoate, diethylene glycol dibenzoate, polyethylene glycol dibenzoate, and combinations thereof. In another embodiment, the plasticizer is selected from the group consisting of phosphates, polyalklylene glycols, dionyl phenol ethoxylates, ethoxylated bisphenol A, liquid rosin derivatives having ring and ball softening point less than 60° C., phosphites, polyethylene glycol, toluene sulfonamide and combinations thereof.

In another embodiment, the composition further includes tackifying resin. In some embodiments, the tackifying resin is selected from the group consisting of natural rosins, modified rosins, rosin esters, phenolic modified terpene resins, phenolic modified alpha methyl styrene resins, aliphatic petroleum hydrocarbon resins, aromatic petroleum hydrocarbon resins, aromatic modified alicyclic petroleum hydrocarbon resins, alicyclic petroleum hydrocarbon resins, and the hydrogenated derivatives thereof and combinations thereof. In one embodiment, the tackifying resin is selected from the group consisting of polylactic acid and glycerol ester of hydrogenated rosin. In one embodiment, the composition further includes a tackifying resin and exhibits a moisture vapor transmission rate of at least 1000 $g/m^2/day$. In other embodiments, the tackifying resin is biodegradable. In some embodiments, the tackifying resin is selected from the group consisting of polylactic acid and poly(hydroxy valerate butyrate).

In some embodiments, the composition further includes breathable thermoplastic polymer. In other embodiments, the breathable thermoplastic polymer is selected from the group consisting of polyether-polyester block copolymers, polyether-polyamide block copolymers and combinations thereof. In one embodiment, the breathable thermoplastic polymer is water sensitive (i.e., water soluble, water dispersible, water swellable or a combination thereof).

In other embodiments, the composition includes from 10% by weight to 70% by weight poly(tetramethylene adipate-co-terephthalate) and from 10% by weight to 50% by weight plasticizer. In one embodiment, the composition includes from 10% by weight to 70% by weight poly(tetramethylene adipate-co-terephthalate) and from 10% by weight to 40% by weight plasticizer. In other embodiments, the composition includes from 10% by weight to 70% by weight poly(tetramethylene adipate-co-terephthalate) and from 10% by weight to 30% by weight plasticizer. In some embodiments, the composition includes from 20% by weight to 60% by weight poly(tetramethylene adipate-co-terephthalate) and from 10% by weight to 30% by weight plasticizer.

In one embodiment, the biodegradable aliphatic-aromatic copolyester is selected from the group consisting of poly (ethylene glutarate-co-terephthalate), poly(tetramethylene glutarate-co-terephthalate), poly(tetramethylene glutarate-co-terephthalate-co-diglycolate), poly(ethylene adipate-co-terephthalate), poly(tetramethylene succinate-co-terephthalate), poly(ethylene glutarate-co-naphthalene dicarboxylate, poly(tetramethylene glutarate-co-naphthalene dicarboxylate), poly(tetramethylene adipate-co-naphthalene dicarboxylate, poly(ethylene adipate-co-naphthalene dicarboxylate), poly(tetramethylene succinate-co-naphthalene dicarboxylate) and poly(ethylene succinate-co-naphthalene dicarboxylate.

In other aspects, the invention features a film that includes a composition described herein. In one embodiment, the film exhibits a moisture vapor transmission rate of at least 400 $g/m^2/day$. In other embodiments, the film exhibits a moisture vapor transmission rate of at least 1000 $g/m^2/day$. In some embodiments, the film exhibits a moisture vapor transmission rate of at least 2000 $g/m^2/day$.

In one embodiment, the plasticizer is selected from the group consisting of citric acid esters, benzoic acid esters and combinations thereof. In some embodiments, the plasticizer is selected from the group consisting of sucrose benzoate, 1,4-cyclohexane dimethanol dibenzoate, diethylene glycol dibenzoate, dipropylene glycol dibenzoate, diethylene glycol dibenzoate, polyethylene glycol dibenzoate, and combinations thereof. In other embodiments, the plasticizer is selected from the group consisting of phosphates, polyalklylene glycols, dionyl phenol ethoxylates, ethoxylated bisphenol A, liquid rosin derivatives having ring and ball softening point less than 60° C., phosphites, polyethylene glycol, toluene sulfonamide and combinations thereof.

In one embodiment, the film further includes tackifying resin. In other embodiments, the film further includes breathable thermoplastic polymer. In some embodiments, the breathable thermoplastic polymer is selected from the group consisting of polyether-polyester block copolymers, polyether-polyamide block copolymers and combinations thereof.

In some embodiments, the film further includes water sensitive breathable thermoplastic polymer. In other embodiments, the film further includes polylactic acid.

In other embodiments, the film includes from 10% by weight to 70% by weight biodegradable aliphatic-aromatic copolyester and from 10% by weight to 50% by weight plasticizer.

In another aspect, the invention features articles that include a composition described herein. In other aspects, the invention features articles that include a film described herein. In one embodiment, the article is selected from the group consisting of textiles, textile laminates, disposable packaging, bed liners, mattress pads, mattress covers, disposable personal hygiene articles, wound dressing, surgical drapes and surgical gowns. In other embodiments, the article is selected from the group consisting of bandages, diapers, sanitary napkins, tampons and undergarment liners.

In other aspects, the invention features an article that includes a nonwoven web and a composition described herein.

In some embodiments, the composition exhibits adhesive properties. In other embodiments, the composition is biodegradable.

The invention features a composition that, when in the form of a film, exhibits an improved moisture vapor transmission rate and increased tack relative to the biodegradable polymer alone. The composition is also well suited to hot melt processing and can be formulated to exhibit a stable viscosity at melt temperature. The composition can also be formulated to include a tackifying resin without sacrificing the moisture vapor transmission rate of a film formed by the composition.

The composition can be formulated to be free of visible bleeding of the plasticizer.

The invention also features a film that can be formulated to be impermeable to water in the liquid form but permeable to moisture vapor and air.

GLOSSARY

In reference to the invention, these terms have the meanings set forth below.

The phrase "water sensitive" means water soluble, water dispersible, water swellable or a combination thereof in an aqueous environment.

The term "biodegradable" means degrades to carbon dioxide and water in composting environment or in a sewer medium.

Other features of the invention will be apparent from the following description of the preferred embodiments thereof, and from the claims.

DETAILED DESCRIPTION

Figure 1:
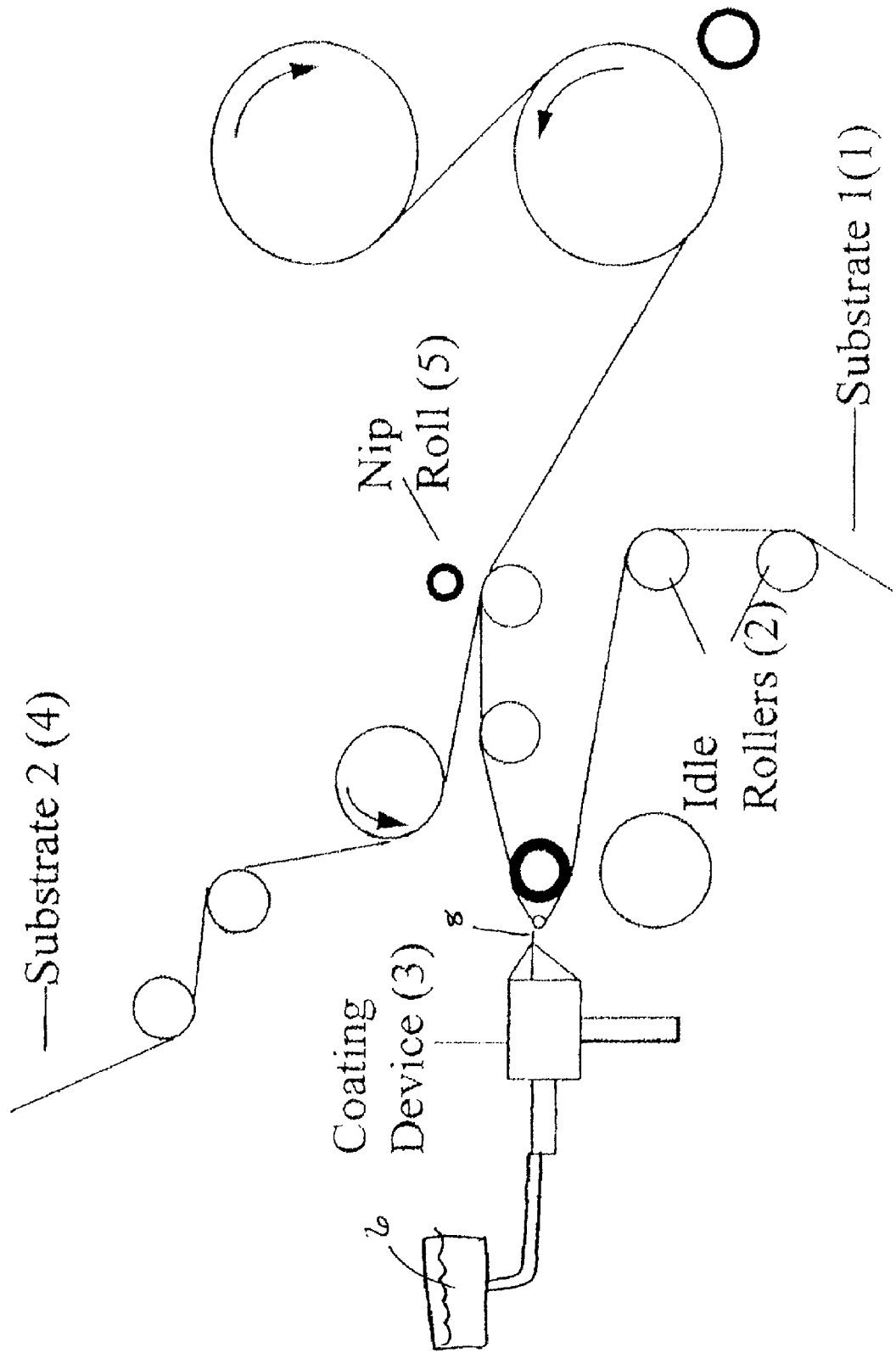
FIG. 1 depicts a method suitable for coating the composition.

The hot melt composition includes biodegradable aliphatic-aromatic copolyester and plasticizer. The composition is capable of forming a breathable film that preferably exhibits a moisture vapor transmission rate (MVTR) of at least 400 g/m$^2$/day, more preferably at least about 1000 g/m$^2$/day, more preferably at least about 2000 g/m$^2$/day. The addition of a plasticizer to a biodegradable aliphatic-aromatic copolyester having relatively low MVTR surprisingly improves the MVTR of the copolyester. The MVTR of the composition is determined according to the MVTR Test Method.

The composition can be formulated to be biodegradable.

The biodegradable aliphatic-aromatic copolyesters break down under compost conditions over a verifiable period of time into organic components including, e.g., carbon dioxide and water. Suitable biodegradable aliphatic-aromatic biodegradable copolyesters include, e.g., poly(tetramethylene adipate-co-terephthalate), poly(ethylene glutarate-co-terephthalate), poly(tetramethylene glutarate-co-terephthalate), poly(tetramethylene glutarate-co-terephthalate-co-diglycolate), poly(ethylene adipate-co-terephthalate), poly(tetramethylene succinate-co-terephthalate), poly(ethylene glutarate-co-naphthalene dicarboxylate), poly(tetramethylene glutarate-co-naphthalene dicarboxylate), poly(tetramethylene adipate-co-naphthalene dicarboxylate, poly(ethylene adipate-co-naphthalene dicarboxylate), poly(tetramethylene succinate-co-naphthalene dicarboxylate) and poly(ethylene succinate-co-naphthalene dicarboxylate. Preferably the biodegradable aliphatic-aromatic copolyester is poly(tetramethylene adipate-co-terephthalate), which is commercially available, e.g., under the trade designation EASTAR BIOCOPOLYESTER from Eastman Chemical Company (Kingsport, Tenn.).

The biodegradable aliphatic-aromatic copolyester is preferably present in the composition in an amount from about 10% by weight to about 70% by weight, more preferably from about 20% by weight to about 60% by weight, most preferably from about 25% by weight to about 50% by weight.

The plasticizer includes polar groups and is preferably hydrophilic. Preferred plasticizers are biodegradable and liquid at room temperature. Examples of suitable plasticizers include citric acid esters (e.g., acetyl-tributyl citrate), benzoic acid esters (e.g., sucrose benzoate, 1,4-cyclohexane dimethanol dibenzoate, diethylene glycol dibenzoate, dipropylene glycol dibenzoate, polyethylene glycol dibenzoate, and diethylene glycol dibenzoate where the mole fraction of hydroxyl groups which have been esterified ranges from 0.5 to 0.95; phthalates (e.g., dioctyl phthalate, butyl benzyl phthalate), phosphates, polyalklylene glycols (e.g., polyethylene glycol having a molecular weight less than 1000 and phenyl ethers of polyethylene glycol), dionyl phenol ethoxylates; ethoxylated bisphenol A; liquid rosin derivatives having ring and ball softening point less than 60° C.; phosphites such as t-butyl diphenyl phosphate; polyethylene glycol having a molecular weight below about 1000 and derivatives of polyethylene glycol (e.g., phenyl ethers of polyethylene glycol), toluene sulfonamide, and combinations thereof.

Useful commercially available plasticizers include plasticizers available under the following trade designations: CITROFLEX 2, CITROFLEX A-2, CITROFLEX 4 and CITROFLEX A-4 plasticizers from Morflex Inc. (Greensboro, N.C.); SANTICIZER 160 and SANTICIZER 154 t-butyl diphenyl phosphate from Monsanto (St. Louis, Mo.); DYNACOL 720 liquid plasticizer from Degussa (Piscataway, N.J.); liquid polymeric plasticizers from C. P. Hall (Chicago, Ill.); BENZOFLEX 352 1,4-cyclohexane dimethanol dibenzoate, BENZOFLEX 50 diethylene glycol/dipropylene glycol dibenzoate, BENZOFLEX 200 polyethylene glycol dibenzoate, BENZOFLEX 9-88 and BENZOFLEX 20-88 dipropylene glycol dibenzoates, BENZOFLEX 400 polypropylene glycol dibenzoate, BENZOFLEX 2-45 diethylene glycol dibenzoate having from 0.5 to 0.95 mole faction esterefied hydroxyl groups all from Velsicol (Rosemont, Ill.); PYCAL 94 phenyl ether of PEG from ICI (Wilmington, Del.), MACOL 206 EM ethoxylated bis phenol A from PPG Industries (Pittsburgh, Pa.), Sulfonic DNP dionyl phenol ethoxylates from Huntsman Chemical Corp. (Houston, Tex.); UNI- PLEX 280 sucrose benzoate and UNIPLEX 214 and UNIPLEX 108 toluene sulfonamides from Unitex Chemical Corp. (Greensboro, N.C.); KETJENFLEX 8 from Akzo Nobel (Chicago, Ill.); and HERCOLYN D methyl ester of hydrogenated resin from Hercules (Wilmington, Del.). Useful biodegradable plasticizers include citric acid esters and the plasticizers available under the CITROFLEX trade designation.

Plasticizer is preferably present in the composition in an amount from about 10% by weight to about 50% by weight, more preferably from about 15% by weight to about 50% by weight, preferably from about 10% by weight to 40% by weight, preferably from about 15% by weight to about 30% by weight.

The composition exhibits some tack and its degree of tack can be enhanced by including tackifying resin. Suitable tackifying resins are generally polar in nature and have a Ring and Ball softening point greater than 60° C., examples of which include natural and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, e.g., glycerol esters of pale, wood rosin, glycerol esters of hydrogenated rosin, glycerol esters of polymerized rosin, pentaerythritol esters of hydrogenated rosin and phenolic-modified pentaerythritol esters of rosin; phenolic modified terpene or alpha methyl styrene resins and hydrogenated derivatives thereof including, e.g., the resin product resulting from the condensation in an acidic medium of a bicyclic terpene and a phenol; aliphatic petroleum hydrocarbon resins having a Ball and Ring softening point of from about 70° C. to 135° C.; the latter resins resulting from the polymerization of monomers consisting primarily of olefins and diolefins; including hydrogenated aliphatic petroleum hydrocarbon resins; aromatic petroleum hydrocarbon resins, and mixed aromatic and aliphatic paraffin hydrocarbon resins and the hydrogenated derivatives thereof; aromatic modified alicyclic petroleum hydrocarbon resins and the hydrogenated derivatives thereof; alicyclic petroleum hydrocarbon resins and the hydrogenated derivatives thereof; low molecular weight polylactic acid; and combinations thereof.

Preferred tackifying resins are biodegradable. Useful biodegradable tackifying resins include, e.g., polylactic acid and polyesters made from 3-hydroxy butyric acid and 3-hydroxy valeric acid. Other useful biodegradable tackifying resins are disclosed, e.g., in U.S. Pat. No. 5,700,344 (Edgington et al.) and U.S. Pat. No. 5,753,724 (Edgington et al.)

Examples of useful commercially available tackifying resins include resins available under the trade designations FORAL NC, KRISTALEX and ENDEX from Hercules (Wilmington, Del.), non-ionic tackifying resins such as FORAL AX and FORAL 85 from Hercules, URATAK 68520 alpha methyl styrene phenolics from DSM Resins (Panama City, Fla.), UNITAC R100L rosin esters from Union Camp, SYLVAREZ TP 300 and SYLVAREZ TP 2040 terpene phenolic tackifying resins from Arizona Chemical (Panama City, Fla.), and CHRONOPOL PLA low molecular weight tacky polylactic acid from Chronopol Inc. (Golden, Colo.).

The tackifying resin can be added to the composition in an amount sufficient to increase the tack of the composition. The tackifying resin can also be selected to facilitate composition processing. Tackifying resin is preferably present in the composition in an amount of from about 5% by weight to about 25% by weight, more preferably from about 10% by weight to about 25% by weight, most preferably from about 10% by weight to about 15% by weight based on the total weight of the composition.

The composition can also include breathable thermoplastic polymers, i.e., thermoplastic polymers that are capable of forming a film having a moisture vapor transmission rate of at least 200 g/m²/day. Examples of useful breathable thermoplastic polymers include, e.g., polyether-polyester block copolymers commercially available under the HYTREL trade designation including HYTREL 8171 and HYTREL G3548 from DuPont (Wilmington, Del.), and polyether-polyamide block copolymers available under the PEBAX trade designation from Atochem North America (Philadelphia, Pa.). Other useful thermoplastic polymers include polyester-polyamide copolymers available under the BAK trade designation from Bayer Corporations (Pittsburgh, Pa.).

Suitable breathable water sensitive thermoplastic polymers include, e.g., crystalline water sensitive thermoplastic polymers and amorphous water sensitive thermoplastic polymers. The term "crystalline polymer" means those polymers that retain their rubbery elastomeric or flexible properties above the glass transition, until the melting temperature has been surpassed. Melting of the crystalline polymer is also accompanied by a loss of crystalline X-ray diffraction effects. The term "amorphous" means those polymers that gradually give way to a soft, extensible elastomeric phase, then to a gum and finally to a liquid with increasing temperature. Amorphous polymers exhibit a smooth transition between phases.

Suitable water soluble crystalline thermoplastic polymers include the reaction product of a polyoxyalkylene glycol diamine and a dicarboxylic acid or dicarboxylic acid ester, where the polyoxyalkylene glycol diamine has the formula:

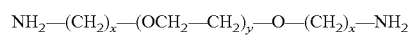

$$NH_2-(CH_2)_x-(OCH_2-CH_2)_y-O-(CH_2)_x-NH_2$$

where X is 2 or 3 and Y is 1 or 2.

Examples of suitable polyoxyalkylene glycol diamines include triethylene glycol diamine, wherein X=2 and Y=1, and tetraethylene glycol diamine, where X=2 and Y=2 and where X=3 and Y=2. Useful commercially available polyoxyalkylene glycol diamines are available under the trade designations JEFFAMINE XTJ-504 and JEFFAMINE EDR-192 (tetraethylene glycol diamine) from Huntsman Chemical Co. (Houston, Tex.). A preferred diamine is 4,7,10-trioxatridecane-1,13-diamine (TTD diamine) where X=3 and Y=2, which is available from BASF (Parsippany, N.J.). Other useful amines include JEFFAMINE D-230, D-400, XTJ-500, XTJ-501 and XTJ-502 provided a chain terminator acid or amine is employed during the reaction, and/or additional ingredients such as waxes, tackifiers, crystalline polymers, and monoacids are subsequently combined with the reacted polyamide. When adipic acid is reacted with TTD diamine and JEFFAMINE D-230, for example, the resulting polyamide is relatively slow setting with respect to reacting adipic acid with TTD diamine alone.

The polyoxyalkylene glycol diamine is reacted with an equal stochiometric ratio of a dicarboxylic acid. Suitable dicarboxylic acids are those having from 5 to 36 carbon atoms including adipic acid, pimelic acid, azelaic acid, sebacic acid, suberic acid, dodecanedioic acid, terephthalic acid, isophthalic acid, t-butyl isophthalic acid, dimer acid and mixtures thereof. The esters and anhydrides of these acids may also be used.

Particularly useful water soluble polyether amides preferably have a melting point no greater than 190° C., which occurs when adipic acid is reacted with JEFFAMINE XTJ-504, when adipic acid is reacted with JEFFAMINE EDR-192, and when adipic acid is reacted with TTD diamine.

The polyamide component can be combined with at least one ingredient selected from the group consisting of waxes, tackifying resins, crystalline polymers, monocarboxylic acids and mixtures thereof. The monocarboxylic acids and monoamines have been found to be useful not only as a reactant as previously described but also as an ingredient to be added after the polyamide is formed.

A suitable crystalline water soluble polyamide is commercially available under the trade designation NP-2126 from H. B. Fuller Company (St. Paul, Minn.). Other suitable crystalline water sensitive polymers include, e.g., polyethylene oxide from Union Carbide (Danbury, Conn.) and crystalline polyesters may also be suitable.

Suitable amorphous water sensitive thermoplastic polymers include, e.g., polyvinyl alcohol, polyvinyl pyrrolidone, polyvinyl pyrrolidone/vinyl acetate, polyvinyl pyrrolidone/acrylic acid, polyetheroxazoline, and linear and branched water dispersible polyesters.

Suitable commercially available amorphous water sensitive thermoplastic polymers include, e.g., polyvinyl alcohol available under the trade designations GROHSERAN L-301 and GROHSERAN L-302 from Nippon Groshei (Japan) and under the trade designation UNITIKA from Unitaka Ltd. (Japan); polyvinyl pyrrolidone available from BASF (Mount Olive, N.J.) and ISP (Wayne, N.J.); polyvinyl pyrrolidone/vinyl acetate copolymer and polyvinyl pyrrolidone/acrylic acid available under the trade designation ACRYLIDONE, both of which are available from ISP; polyethyloxazoline available under the trade designation PEOX from The Dow Chemical Company (Freeport, Tex.) and under the trade designation AQUAZOL from PCI Incorporated (Tucson, Ariz.), polyvinyl methyl ether available under the trade designation AMOBOND from Amoco Chemical Co., linear polyesters, polyacrylamide and water dispersible polyesters and copolyesters available under the trade designation EASTMAN AQ including EASTMAN AQ-14000, EASTMAN AQ-1950 and EASTMAN AQ-1045 from Eastman Chemical Company (Kingsport, Tenn.).

The water dispersible polyesters and copolyesters available under the EASTMAN AQ trade designation are linear polyesters or branched sulfonated copolyesters. Such polymers are saline and body fluid insoluble, yet dispersible in tap water. The Tg of the branched water dispersible copolyesters ranges from about −5° C. to 7° C., whereas the linear polyesters have a Tg from about 30° C. to about 60° C. Linear thermoplastic water dispersible polyesters are commercially available under the EASTMAN AQ series of trade designations including, e.g., EASTMAN AQ 35S (11,000 Mn), AQ 38S (11,000 Mn), AQ 48S (9,000 Mn), and AQ 55S (10,000 Mn) all from Eastman Chemical Company (Kingsport, Tenn.). Branched thermoplastic water dispersible polyesters are commercially available under the EASTMAN AQ series of trade designations including, e.g., EASTMAN AQ 1045, AQ 1350, AQ 1950 and AQ 14000 from Eastman Chemical Company.

Other useful water dispersible polymers are commercially available under the HYDROMELT trade designation from H. B. Fuller Company (St. Paul, Minn.).

Useful water sensitive thermoplastic polymers and their methods of manufacture are disclosed, e.g., in U.S. Pat. No. 3,882,090 (Fagerberg et al.), U.S. Pat. No. 5,053,484 (Speranza et al.), U.S. Pat. No. 5,118,785 (Speranza et al.), U.S. Pat. No. 5,086,162 (Speranza et al.), U.S. Pat. No. 5,324,812 (Speranza et al.), U.S. Pat. No. 5,899,675 (Ahmed et al.), U.S. Pat. No. 5,863,979 (Ahmed et al.), U.S. Pat. No. 5,663,286 (Ahmed et al.), U.S. Pat. No. 5,869,596 (Ahmed et al.) and U.S. Pat. No. 6,103,809 (Ahmed et al.), and incorporated herein.

The composition can also include biodegradable thermoplastic polymers including, e.g., polylactic acid polymers, polyesters made from 3-hydroxy butyric acid and 3-hydroxy valeric acid (which are available, e.g., under the BIOPOL trade designation from Monsanto Company (St. Louis, Mo.)), and polyester urethane thermoplastic polymers, all having a molecular weight (Mn) greater than 20,000, preferably greater than 30,000.

Useful biodegradable polylactic acid thermoplastic polymers include high molecular weight linear polyesters of polylactic acid. Suitable commercially available polylactic acid thermoplastic polyesters are available from Cargill Inc. (Minnetonka, Minn.).

Useful biodegradable urethane polyesters can be prepared by reacting polyisocyanate, typically having two or three isocyanato groups on an aromatic or aliphatic nucleus, with polyester. Polyesters can be prepared by reacting a hydroxy compound having two or more hydroxy groups with an acid compound having two or more carboxyl groups to form the polyester backbone. Preferred hydroxy compounds include ethylene glycol, propylene glycol, 1,4-butene glycol, polymers made from ethylene oxide, propylene oxide, butylene oxide having two or more free hydroxyl groups and other similar diol, triol and polyol compounds. Useful acids that can be used in making the polyester urethanes of the invention include di- and tri-carboxylic acid substituted compounds including, e.g., oxalic acid, malic acid, maleic acid, phthalic acid, terephthalic acid and pyromellitic acid. Suitable polyesters can also be prepared from hydroxy-carboxylic acid containing compounds including, e.g., hydroxy acids such as lactic acid and hydroxybutyric acid and polymers such as polycaprolactone diols and polyethylene glycols. The hydroxy compounds and the acid compound can be reacted under condensation reaction conditions with the removal of water to form ester bonds resulting in the formation of the thermoplastic polyester resin.

Thermoplastic polymer, when present, is preferably present in the composition in an amount of from about 5% by weight to about 50% by weight, more preferably from about 10% by weight to about 40% by weight, most preferably from about 15% by weight to about 40% by weight based on the total weight of the composition.

The composition can be provided in various forms including, e.g., adhesive compositions, binders, films, fibers, nonwovens, coatings (e.g., continuous or discontinuous), binders, impregnates, and laminates, and as a breathable layer (e.g., a sheet) in various application. The composition in its various forms is useful in a variety of applications including, e.g., textiles, textile laminates, disposable packaging including, e.g., food and product packaging, bed liners, mattress pads, mattress covers, disposable personal hygiene articles including, e.g., bandages, diapers, sanitary napkins, tampons and undergarment liners, other articles including, e.g., wound dressing, surgical drapes and surgical gowns.

The composition can be applied to a substrate as a coating including, e.g., continuous and discontinuous coatings and films, using a variety of techniques including, e.g., hot melt coating, extrusion, spray (e.g., spiral spray) coating, depositing beads of composition, melt blowing, laminating, impregnating and combinations thereof.

An example of a useful coating method includes rendering a composition flowable, i.e., melting the composition, and releasing the composition from a coating device, e.g., a slot die coater, onto a substrate, without contact between the coating device and the substrate. The method can provide a product having good tactile quality when the composition is applied at low and high coating weights. Thin coating weight reduces the stiffness of the coated material and provides a textile material that equates in softness to an uncoated textile material. The method can also be used to provide soft materials with high coating weights. Useful coating methods are described, e.g., in U.S. Pat. No. 5,827,252, U.S. Pat. No. 6,120,887 and WO 99/28048, and incorporated herein.

FIG. 1 illustrates one example of a method in which a first substrate 1 is advanced by the drive rolls past a series of idle rollers (2) to ensure the first substrate (1) is in proper alignment prior to approaching the coating device (3). The coating device (3) is located at a distance from the substrate (1) to be coated, the distance ranging from about 0.5 mm to about 20 mm depending on the properties of the composition (6) being coated. An optional second substrate (4) can be adhered to the coated surface of the first substrate (1) by means of a nip roll (5). When adherence to a second substrate (4) is intended, it is often preferred to position the nip roll (5) closer to the coating device (3) at a distance of about 25 cm from the coating device (3).

The composition (6) exits the coating device (3) in the form of a continuous film (8). When the composition (6) leaves the coating device (3) in the form of a film (8), it does not contact the substrate (1) immediately. Instead, it travels for a distance as a continuous film suspended above the substrate (1) without touching the substrate (1). The distance between the coating device and the substrate ranges from about 0.5 mm to about 20 mm. The distance is largely influenced by the viscosity of the composition being coated. Preferably the continuous film (8) travels in a substantially horizontal direction to contact the first substrate (1), i.e., the continuous film is directed in a horizontal direction and the substrate to be coated is directed in a vertical direction.

The invention will now be described further by way of the following examples. All parts, ratios, percents and amounts stated in the Examples are by weight unless otherwise specified.

EXAMPLES

Test Procedures

Test procedures used in the examples include the following.

Moisture Vapor Transmission Rate (MVTR) Test Method

Moisture vapor transmission rate is determined according to the water method of ASTM E96-95 Upright Cup Method entitled, "Standard Test Methods for Water Vapor Transmission of Materials," Mar. 6, 1995, and reported in $g/m^2/day$ (where 1 day is 24 hours). The sample film thickness is from 1 to 3 mils and the results are normalized to 1 mil.

| Components | | |
|---|---|---|
| Trade Designation | Chemical Description | Supplier |
| EASTAR BIOCOPOLYESTER | poly(tetramethylene adipate-co-terephthalate) polymer having an inherent viscosity of 1.20 | Eastman Chemical Company, Kingsport, Tennessee |
| EASTAR BIOCOPOLYESTER | poly(tetramethylene adipate-co-terephthalate) polymer having an inherent viscosity of 1.06 | Eastman Chemical Company |
| CITROFLEX | 2 triethyl citrate | Morflex, Inc., Greensboro, North Carolina |
| CITROFLEX A-4 | acetyltributyl citrate | Morflex, Inc. |
| BENZOFLEX 9-88 | dipropylene glycol dibenzoate | Velsicol Chemical, Inc., Rosemount, Illinois |
| BENZOFLEX 352 | 1,4-cyclohexane dimethanol dibenzoate | Velsicol Chemical, Inc. |
| BENZOFLEX 2088 | blend of benzoate plasticizers including dibenzoate diethylene glycol dibenzoate, triethylene glycol dibenzoate and dipropylene glycol dibenzoate | Velsicol Chemical, Inc. |
| UNIPLEX 280 | sucrose benzoate | Unitex Chemical Corp., Greensboro, North Carolina |
| CHRONOPOL 1091 | polylactic acid | Cargill, Inc., Minnetonka, Minnesota |
| FORAL AX | hydrogenated wood rosin | Hercules, Inc., Wilmington, Delaware |
| FORAL 85 | glycerol ester of hydrogenated rosin | Hercules, Inc. |
| SYLVARES TP 2040 | alpha-pinene phenol resin | Arizona Chemical, Inc., Panama City, Florida |
| SYLVATAC RE 100 | resin acids and rosin acids esters with pentaerythritol | Arizona Chemical, Inc. |
| KRISTALEX 3085 | hydrocarbon resin primarily alpha-methyl styrene resin | Hercules, Inc. |
| HYTREL HTR8171 | butylene/poly(alkylene ether)phthalate thermoplastic polymer | Dupont, Wilmington, Delaware |
| HERCULES A-2689 | aromatic-modified aliphatic hydrocarbon resin | Hercules, Inc. |

Control 1

A thin film was prepared by coating molten neat EASTAR BIOCOPOLYESTER poly(tetramethylene adipate-co-terephthalate) polymer (Eastman Chemical Company, Kingsport, Tenn.) on a release liner at a temperature of from 175° C. to 190° C.

Control 2

A thin film was prepared by coating molten neat EASTAR BIOCOPOLYESTER poly(tetramethylene adipate-co-terephthalate) polymer (Eastman Chemical Company) on a release liner at a temperature of from 175° C. to 190° C.

Examples 1-25

Compositions were prepared by combining the components in the amounts (in units of % by weight) specified in Table 1, with mixing, at 375° F. Each composition was hot melt coated to form a film. The MVTR results set forth in Table 1 have been normalized to a film thickness of 1 mil. The films of Examples 1, 3, 4 and 6-25 were observed to be free of visible plasticizer bleeding. The film of Example 5 exhibited visible plasticizer bleeding and no MVTR was recorded.

TABLE 1

| Sample | Eastarbio IV 1.20 | Eastarbio IV 106 | Citroflex 2 | Citroflex A4 | Benzoflex 9-88 | Benzoflex 352 | Uniplex 280 | Chronopol 1091 |
|---|---|---|---|---|---|---|---|---|
| Control 1 | 100 | — | — | — | — | — | — | — |
| Control 2 | — | 100 | — | — | — | — | — | — |
| 1 | 60 | — | 40 | — | — | — | — | — |
| 2 | 60 | — | — | 40 | — | — | — | — |
| 3 | 60 | — | — | — | 40 | — | — | — |
| 4 | — | 60 | 40 | — | — | — | — | — |
| 5 | — | 60 | — | 40 | — | — | — | — |
| 6 | — | 60 | — | — | 40 | — | — | — |
| 7 | — | 55 | 30 | — | — | — | — | — |
| 8 | 55 | — | 30 | — | — | — | — | — |
| 9 | 55 | — | 30 | — | — | — | — | — |
| 10 | 55 | — | 30 | — | — | — | — | — |
| 11 | 55 | — | 30 | — | — | — | — | — |
| 12 | 55 | — | 30 | — | — | — | — | — |
| 13 | 55 | — | 30 | — | — | — | — | — |
| 14 | 44.5 | — | 30 | — | — | — | — | — |
| 15 | — | 44.5 | 30 | — | — | — | — | — |
| 16 | 44.5 | — | 30 | — | — | — | — | — |
| 17 | — | 44.5 | 30 | — | — | — | — | — |
| 18 | — | 44.5 | 30 | — | — | — | — | — |
| 19 | 44.5 | — | 30 | — | — | — | — | — |
| 20 | — | 50.3 | — | — | 49 | — | — | — |
| 21 | — | 50.3 | — | — | 49[A] | — | — | — |
| 22 | 60 | — | 10 | — | — | — | — | 30 |
| 23 | 60 | — | 10 | — | — | 30 | — | — |
| 24 | 70 | — | 10 | — | — | — | 30 | — |
| 25 | 60 | — | 10 | — | — | — | 30 | — |

| Sample | Foral AX | Foral 85 | Sylvarez TP 2040 | Sylvatac RE 100 | Krystalex 3085 | Hercules A-2689 | Hytrel 8171 | MVTR g/m²/day |
|---|---|---|---|---|---|---|---|---|
| Control 1 | — | — | — | — | — | — | — | 300 |
| Control 2 | — | — | — | — | — | — | — | 387 |
| 1 | — | — | — | — | — | — | — | 1689 |
| 2 | — | — | — | — | — | — | — | NT |
| 3 | — | — | — | — | — | — | — | 933 |
| 4 | — | — | — | — | — | — | — | 1177 |
| 5 | — | — | — | — | — | — | — | NT |
| 6 | — | — | — | — | — | — | — | 703 |
| 7 | — | — | 15 | — | — | — | — | 762 |
| 8 | — | — | 15 | — | — | — | — | 1350 |
| 9 | — | — | — | 15 | — | — | — | 656 |
| 10 | — | — | — | — | 15 | — | — | 449 |
| 11 | — | — | — | — | — | 15 | — | 1271 |
| 12 | 15 | — | — | — | — | — | — | 765 |
| 13 | — | — | — | — | — | — | — | 875 |
| 14 | — | 10 | — | — | — | — | 15 | 1658 |
| 15 | — | 10 | — | — | — | — | 15 | 1564 |
| 16 | 10 | — | — | — | — | — | 15 | 1936 |
| 17 | 10 | — | — | — | — | — | 15 | 2426 |
| 18 | 10 | — | — | — | — | — | 15 | 1303 |
| 19 | 10 | — | — | — | — | — | 15 | 1338 |
| 20 | — | — | — | — | — | — | — | 895 |
| 21 | — | — | — | — | — | — | — | 902 |
| 22 | — | — | — | — | — | — | — | 744 |
| 23 | — | — | — | — | — | — | — | 407 |
| 24 | — | — | — | — | — | — | — | 351 |
| 25 | — | — | — | — | — | — | — | 394 |

[A] = Benzoflex 2088 was used instead of Benzoflex 9-88.
NT = not tested

What is claimed is:

1. A composition consisting essentially of:
poly(tetramethylene adipate-co-terephthalate);
plasticizer comprising polar groups; and
optionally tackifying resin,
said composition exhibiting a moisture vapor transmission rate of at least 400 g/m$^2$/day.

2. The composition of claim 1, wherein said composition exhibits a moisture vapor transmission rate of at least 1000 g/m$^2$/day.

3. The composition of claim 1, wherein said composition exhibits a moisture vapor transmission rate of at least 2000 g/m$^2$/day.

4. The composition of claim 1, wherein said plasticizer is selected from the group consisting of esters of citric acid, benzoic acid esters, and combinations thereof.

5. The composition of claim 1, wherein said plasticizer is selected from the group consisting of sucrose benzoate, 1,4-cyclohexane dimethanol dibenzoate, diethylene glycol dibenzoate, dipropylene glycol dibenzoate, polyethylene glycol dibenzoate, and combinations thereof.

6. The composition of claim 1, wherein said plasticizer is selected from the group consisting of phosphates, polyalklylene glycols, dionyl phenol ethoxylates, ethoxylated bisphenol A, liquid rosin derivatives having a ring and ball softening point less than 60° C., phosphites, toluene sulfonamide, and combinations thereof.

7. A composition comprising:
poly(tetramethylene adipate-co-terephthalate); and
plasticizer comprising polar groups, said plasticizer being selected from the group consisting of esters of citric acid, benzoic acid esters, sucrose benzoate, 1,4-cyclohexane dimethanol dibenzoate, diethylene glycol dibenzoate, dipropylene glycol dibenzoate, polyethylene glycol dibenzoate, polyalklylene glycols, dionyl phenol ethoxylates, ethoxylated bisphenol A, liquid rosin derivatives having a ring and ball softening point less than 60° C., phosphites, toluene sulfonamide, and combinations thereof,
said composition exhibiting a moisture vapor transmission rate of at least 656 g/m$^2$/day.

8. The composition of claim 1 comprising said tackifying resin, wherein said tackifying resin is selected from the group consisting of natural rosins, modified rosins, rosin esters, phenolic modified terpene resins, phenolic modified alpha methyl styrene resins, aliphatic petroleum hydrocarbon resins, aromatic petroleum hydrocarbon resins, aromatic modified alicyclic petroleum hydrocarbon resins, alicyclic petroleum hydrocarbon resins, and the hydrogenated derivatives thereof, and combinations thereof.

9. The composition of claim 1, wherein said tackifying resin is selected from the group consisting of polylactic acid and glycerol ester of hydrogenated rosin.

10. The composition of claim 7, wherein said composition exhibits a moisture vapor transmission rate of at least 1000 g/m$^2$/day.

11. The composition of claim 1, wherein said tackifying resin is biodegradable.

12. The composition of claim 1, wherein said tackifying resin is selected from the group consisting of polylactic acid and poly(hydroxy valerate butyrate).

13. The composition of claim 7, further comprising breathable thermoplastic polymer.

14. The composition of claim 13, wherein said breathable thermoplastic polymer is selected from the group consisting of polyether-polyester block copolymers, polyether-polyamide block copolymers, and combinations thereof.

15. The composition of claim 13, wherein said breathable thermoplastic polymer is water sensitive.

16. The composition of claim 1, comprising
from 10% by weight to 70% by weight poly(tetramethylene adipate-co-terephthalate), and
from 10% by weight to 50% by weight plasticizer.

17. The composition of claim 1, comprising
from 10% by weight to 70% by weight poly(tetramethylene adipate-co-terephthalate), and
from 10% by weight to 40% by weight plasticizer.

18. The composition of claim 1, comprising
from 10% by weight to 70% by weight poly(tetramethylene adipate-co-terephthalate), and
from 10% by weight to 30% by weight plasticizer.

19. The composition of claim 1, comprising
from 20% by weight to 60% by weight poly(tetramethylene adipate-co-terephthalate), and
from 10% by weight to 30% by weight plasticizer.

20. A composition consisting essentially of:
biodegradable aliphatic-aromatic copolyester; and
plasticizer comprising polar groups,
said composition exhibiting a moisture vapor transmission rate of at least 400 g/m$^2$/day.

21. The composition of claim 20, wherein said biodegradable aliphatic-aromatic copolyester is selected from the group consisting of poly(ethylene glutarate-co-terephthalate), poly(tetramethylene glutarate-co-terephthalate), poly(tetramethylene glutarate-co-terephthalate-co-diglycolate), poly(ethylene adipate-co-terephthalate), poly(tetramethylene succinate-co-terephthalate), poly(ethylene glutarate-co-naphthalene dicarboxylate), poly(tetramethylene glutarate-co-naphthalene dicarboxylate), poly(tetramethylene adipate-co-naphthalene dicarboxylate), poly(ethylene adipate-co-naphthalene dicarboxylate), poly(tetramethylene succinate-co-naphthalene dicarboxylate), poly(ethylene succinate-co-naphthalene dicarboxylate, and combinations thereof.

22. The composition of claim 20, wherein said composition exhibits a moisture vapor transmission rate of at least 2000 g/m$^2$/day.

23. A composition consisting of:
biodegradable aliphatic-aromatic copolyester; and
plasticizer comprising polar groups,
said composition exhibiting a moisture vapor transmission rate of at least 400 g/m$^2$/day.

24. The composition of claim 7, further comprising tackifying resin.

25. The composition of claim 7, wherein said composition exhibits a moisture vapor transmission rate of at least 1000 g/m$^2$/day.

26. The composition of claim 7, wherein said composition exhibits a moisture vapor transmission rate of at least 2000 g/m$^2$/day.

* * * * *